(12) United States Patent
Diekmeyer

(10) Patent No.: US 7,997,842 B2
(45) Date of Patent: Aug. 16, 2011

(54) THREADED CONNECTION

(75) Inventor: Heinrich Diekmeyer, Barsinghausen (DE)

(73) Assignee: WABCO GmbH, Hannover (DE)

( * ) Notice: Subject to any disclaimer, the term of this patent is extended or adjusted under 35 U.S.C. 154(b) by 42 days.

(21) Appl. No.: 11/666,053

(22) PCT Filed: Oct. 18, 2005

(86) PCT No.: PCT/EP2005/011165
§ 371 (c)(1),
(2), (4) Date: Apr. 19, 2007

(87) PCT Pub. No.: WO2006/048113
PCT Pub. Date: May 11, 2006

(65) Prior Publication Data
US 2008/0089759 A1 Apr. 17, 2008

(30) Foreign Application Priority Data
Nov. 3, 2004 (EP) .................................... 04026049

(51) Int. Cl.
*F16B 33/00* (2006.01)

(52) U.S. Cl. .................. 411/366.1; 411/366.3; 411/414; 411/411

(58) Field of Classification Search ............... 411/366.1, 411/366.3, 414, 411
See application file for complete search history.

(56) References Cited

U.S. PATENT DOCUMENTS

| | | | | |
|---|---|---|---|---|
| 1,828,856 A * | 10/1931 | Bridges | ................. | 411/308 |
| 2,150,875 A * | 3/1939 | Caminez | ................. | 29/456 |
| 2,262,450 A * | 11/1941 | Caminez | ................. | 411/282 |
| 2,322,603 A * | 6/1943 | Thumim et al. | ................. | 96/111 |
| 2,407,741 A * | 9/1946 | Goodby | ................. | 411/311 |
| 2,567,483 A * | 9/1951 | Hotine | ................. | 74/441 |
| 2,681,815 A * | 6/1954 | McCarn | ................. | 285/333 |
| 3,056,443 A * | 10/1962 | Knocke | ................. | 411/186 |
| 3,355,192 A * | 11/1967 | Kloesel, Jr. et al. | ................. | 285/94 |
| 3,446,262 A * | 5/1969 | Phipard, Jr. | ................. | 411/257 |
| 3,462,175 A * | 8/1969 | Johnson | ................. | 285/53 |
| 3,464,186 A * | 9/1969 | William et al. | ................. | 96/115 |
| 3,506,377 A * | 4/1970 | Thackrey | ................. | 411/366.3 |
| 3,667,775 A * | 6/1972 | Whelan | ................. | 280/5.514 |
| 3,707,107 A * | 12/1972 | Bieri | ................. | 411/423 |
| 4,023,630 A * | 5/1977 | Perkin et al. | ................. | 175/297 |
| 4,076,064 A * | 2/1978 | Holmes | ................. | 411/285 |
| 4,171,012 A * | 10/1979 | Holmes | ................. | 411/285 |
| 4,346,920 A * | 8/1982 | Dailey | ................. | 285/89 |
| 4,799,707 A * | 1/1989 | Buma et al. | ................. | 280/124.161 |
| 4,799,844 A * | 1/1989 | Chuang | ................. | 411/414 |
| 4,907,926 A * | 3/1990 | Wing | ................. | 411/366.3 |
| 4,999,035 A * | 3/1991 | Warndorf | ................. | 96/117.5 |
| 5,060,740 A * | 10/1991 | Yousef et al. | ................. | 175/415 |

(Continued)

FOREIGN PATENT DOCUMENTS
DE             74 36 651           6/1975

*Primary Examiner* — Victor Batson
*Assistant Examiner* — Roberta Delisle
(74) *Attorney, Agent, or Firm* — Kramer Levin Naftalis & Frankel LLP

(57) ABSTRACT

An improved threaded connection, in which a first part having a female thread is threadably engageable with a second part having a male thread. The first and second parts have different strengths in at least the area of the thread turns, and the thread turns have cross-sectional areas that differs from the cross-sectional areas of gaps between the thread turns.

40 Claims, 5 Drawing Sheets

U.S. PATENT DOCUMENTS

| | | | |
|---|---|---|---|
| 5,127,784 A * | 7/1992 | Eslinger | 411/414 |
| 5,282,707 A * | 2/1994 | Palm | 411/3 |
| 5,320,467 A * | 6/1994 | Erbes | 411/386 |
| 5,711,150 A * | 1/1998 | Oshita et al. | 60/407 |
| 5,738,472 A * | 4/1998 | Roopnarine et al. | 411/309 |
| 6,094,836 A * | 8/2000 | Mahoney et al. | 34/80 |
| 6,098,967 A * | 8/2000 | Folchert | 267/64.16 |
| 6,116,586 A * | 9/2000 | Westerkamp et al. | 267/64.28 |
| 6,332,623 B1 * | 12/2001 | Behmenburg et al. | 280/124.16 |
| 6,484,413 B1 * | 11/2002 | Larsson | 34/80 |
| 6,527,839 B2 * | 3/2003 | Fornof et al. | 96/136 |
| 6,685,174 B2 * | 2/2004 | Behmenburg et al. | 267/64.28 |
| 6,786,953 B2 * | 9/2004 | Fornof et al. | 95/122 |
| 2003/0007844 A1* | 1/2003 | Terry | 411/186 |
| 2003/0110949 A1 * | 6/2003 | Fornof et al. | 96/136 |
| 2006/0140739 A1* | 6/2006 | Komine | 411/308 |

* cited by examiner

THREADED CONNECTION

BACKGROUND OF THE INVENTION

The present invention relates to an improved threaded connection.

Threaded connections are known—see e.g., U.S. Pat. No. 5,282,707. Threads employed in such connections can be formed, for example, using metric ISO standard thread, which has gained widespread use.

With conventional threaded connections, the use of materials of different strengths for the male threads and female threads can result in damage to the threaded part formed from the lower-strength material when the threaded connection is overtightened. For this reason, it is standard practice for technical specifications to include the highest permissible tightening torques for threaded connections in order to avoid damage. In many cases, however, such as, for example, when replaceable cartridges are being screwed on, as in the case of air dryers in compressed-air brake systems for commercial vehicles, or even oil filters, it is standard practice to tighten the threaded connection by hand, without using a preadjustable torque wrench. Also, it is generally desirable in other applications of threaded connections to prevent accidental damage, such as can occur due to incorrect adjustment of a torque wrench or inadvertent failure to use a torque wrench.

SUMMARY OF THE INVENTION

Generally speaking, in accordance with the present invention, an improved threaded connection is provided that overcomes disadvantages associated with conventional threaded connections.

In an embodiment of the thread according to the present invention, in which a first part having a female thread is joined to a second part having a male thread, the first and second parts have different strengths in the area of the thread turns, and the thread turns have cross-sectional surfaces that differ from the cross-sectional areas of the gaps between the thread turns.

According to an advantageous embodiment of the present invention, the threadform is asymmetric—the male thread having a larger, heavier cross section; the female thread having a comparatively slender cross section, which is relatively elastic because of the geometry.

According to another advantageous embodiment of the invention, by the use of a geometrically heavier configuration of the cross-sectional surface of the threaded part made of lesser strength material (male, female), increased strength and safety against damage can be achieved in a simple manner.

The present invention generally has the advantage that the threaded connection can be tightened and loosened without using special tools such as a torque wrench and without the need for special precautions against overtightening, such as technical warnings. In particular, in the case of use of the present invention in replaceable cartridge systems, the replaceable cartridges can be securely screwed on by hand, without any worry about damage to the thread.

A further advantage of the present invention is realized in application in air dryers and air-supply systems in commercial vehicles, where the air dryers of such systems are exposed to cyclically varying pressure loads, for example during the change from the compression phase to the regeneration phase, which leads to corresponding stressing of the threads. Even in such cases of cyclically varying, and, especially, cyclically pulsating, stress, high endurance strength of the threaded connection can be achieved by use of the inventive construction.

Yet a further advantage is realized in application in air dryers for compressed-air systems in heavy trucks. In such application, the present invention obviates the need, previously common heretofore, for steel inserts in fixtures such as aluminum housings for air-dryer cartridges, for example in an air-supply system. As a result, the air-supply system can be manufactured more simply and more inexpensively.

It is, therefore, an object of the present invention to provide a threaded connection that, by its design, avoids damage due to overtightening.

Still other objects and advantages of the present invention will in part be obvious and will in part be apparent from the specification.

The present invention accordingly comprises the features of construction, combination of elements, and arrangements of parts which will be exemplified in the construction hereinafter set forth, and the scope of the invention will be indicated in the claims.

BRIEF DESCRIPTION OF THE DRAWINGS

The present invention will be described in more detail hereinafter on the basis of the accompanying drawings, wherein.

DETAILED DESCRIPTION OF THE PREFERRED EMBODIMENTS

Figure 1:
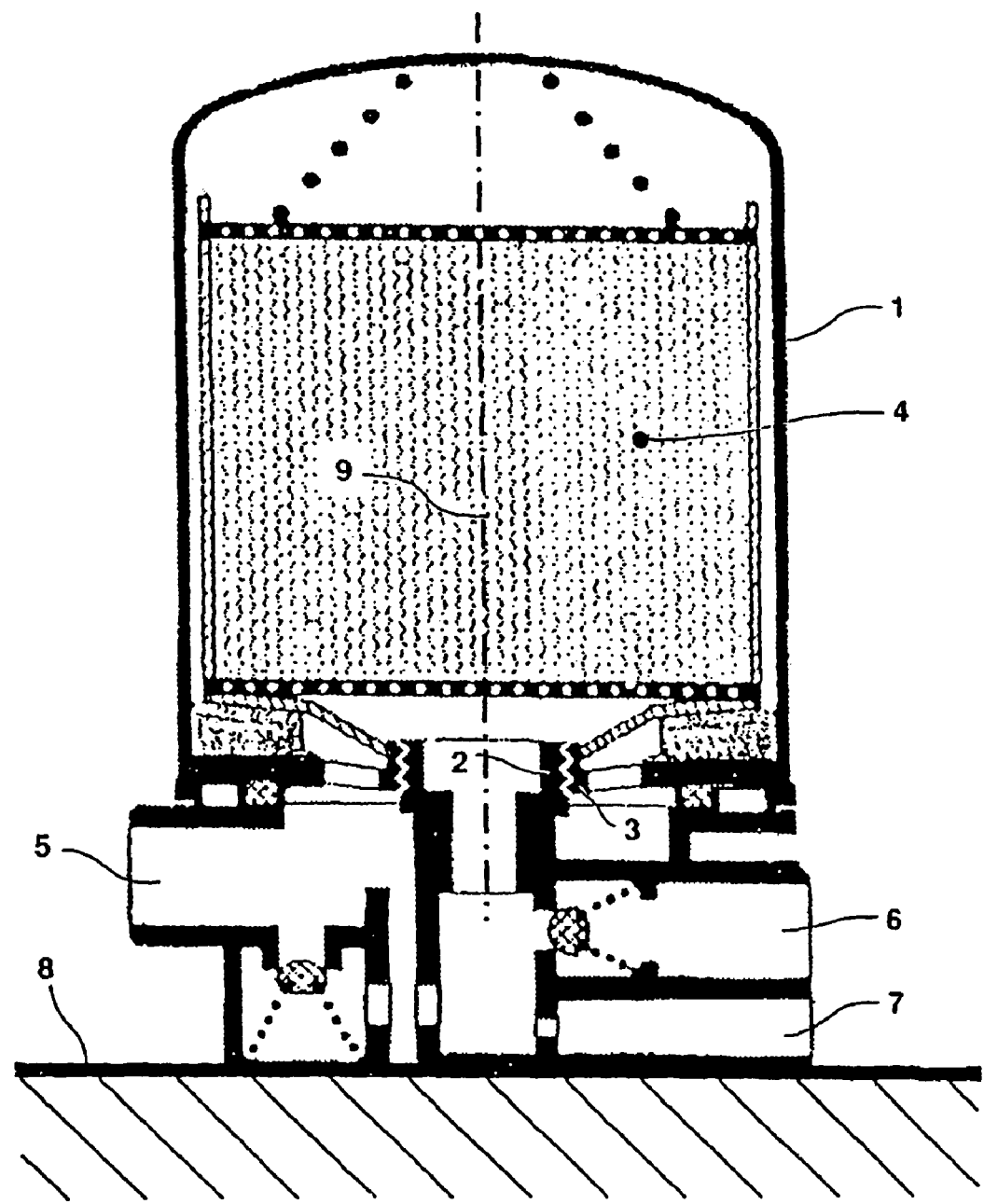
FIG. 1 depicts an air-dryer cartridge screwed onto an air-supply system for the compressed-air system of a vehicle by a threaded connection in accordance with one embodiment of the present invention.

Referring now to the drawings, where like and corresponding parts are represented with like reference numerals, FIG. 1 shows a replaceable cartridge (1) screwed onto a device (8) using a threaded connection in accordance with one embodiment of the present invention. In this embodiment, replaceable cartridge (1) is constructed as an air-dryer cartridge, and device (8), which also functions as the seating fixture for the air-dryer cartridge, is constructed, for example, as the air-supply system for the compressed-air system of a heavy truck. Various air ports (5, 6, 7) supply air to and discharge it from replaceable cartridge (1), among other purposes. A desiccant packing (4) is provided in replaceable cartridge (1) to absorb moisture from the air passing through the cartridge.

Replaceable cartridge (1) includes a female threaded part (3) and is designed to be screwed onto a male threaded part (2) of device (8). Part (3) having female thread (30) and part (2) having male thread (20, 22) are components of the threaded connection, which will be described in more detail hereinafter on the basis of FIGS. 2 to 5. Threaded parts (2, 3) have different strengths and different moduli of elasticity (E1, E2), at least in the region of the thread flights. Dot-dash line (9) in FIGS. 2 to 5 represents the longitudinal axis of male thread (20, 22).

Figure 2:
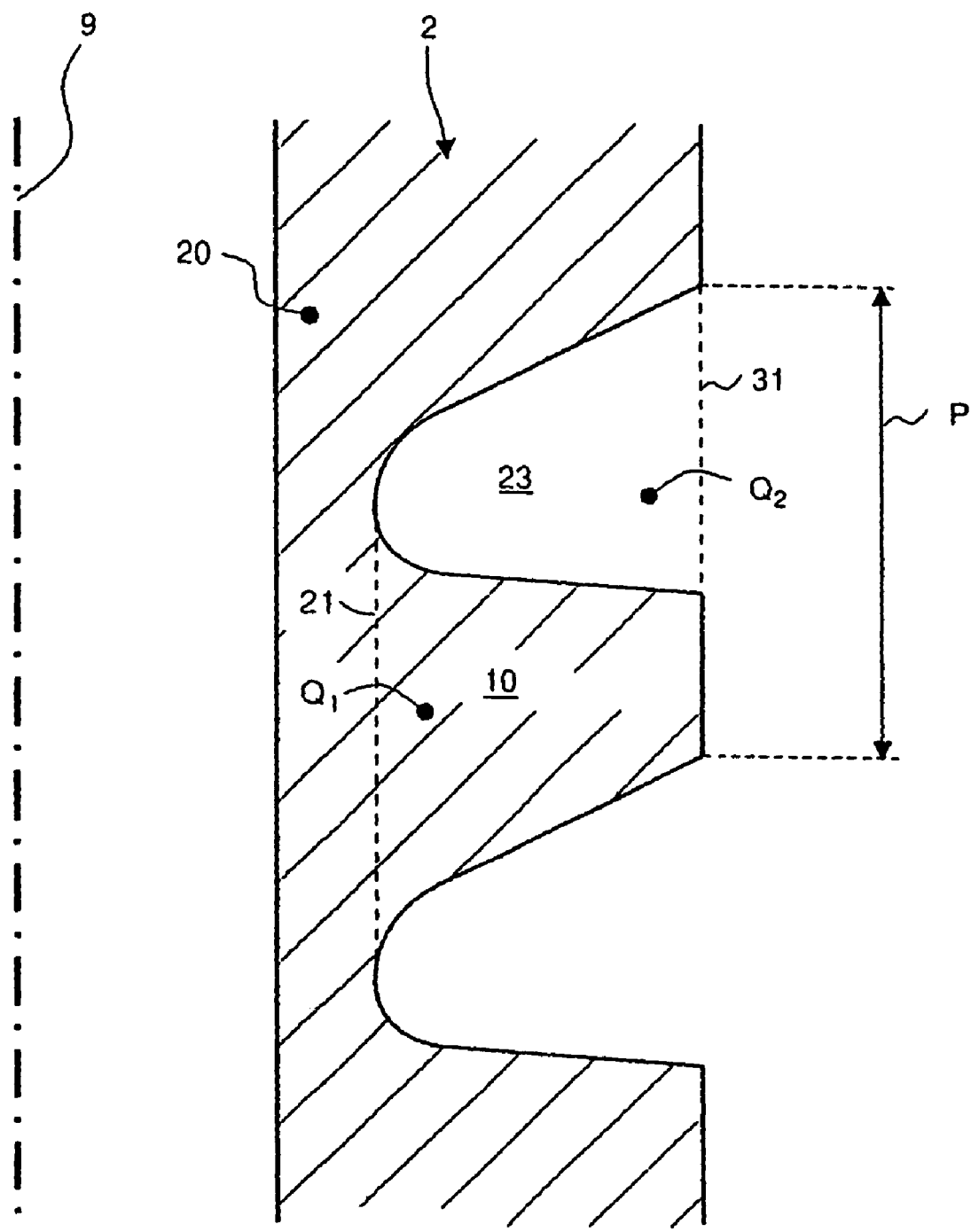
FIG. 2 is an enlarged cross-sectional view of a portion of male thread in accordance with an embodiment of the present invention.

FIG. 2 depicts an embodiment of the inventive thread as male thread (20). Male thread (20) is provided with thread flights (10) with respective cross-sectional surfaces (Q1). Between each two thread flights (10) there is a gap (23) with a respective cross-sectional area (Q2). The thread has a thread pitch (P).

Figure 3:
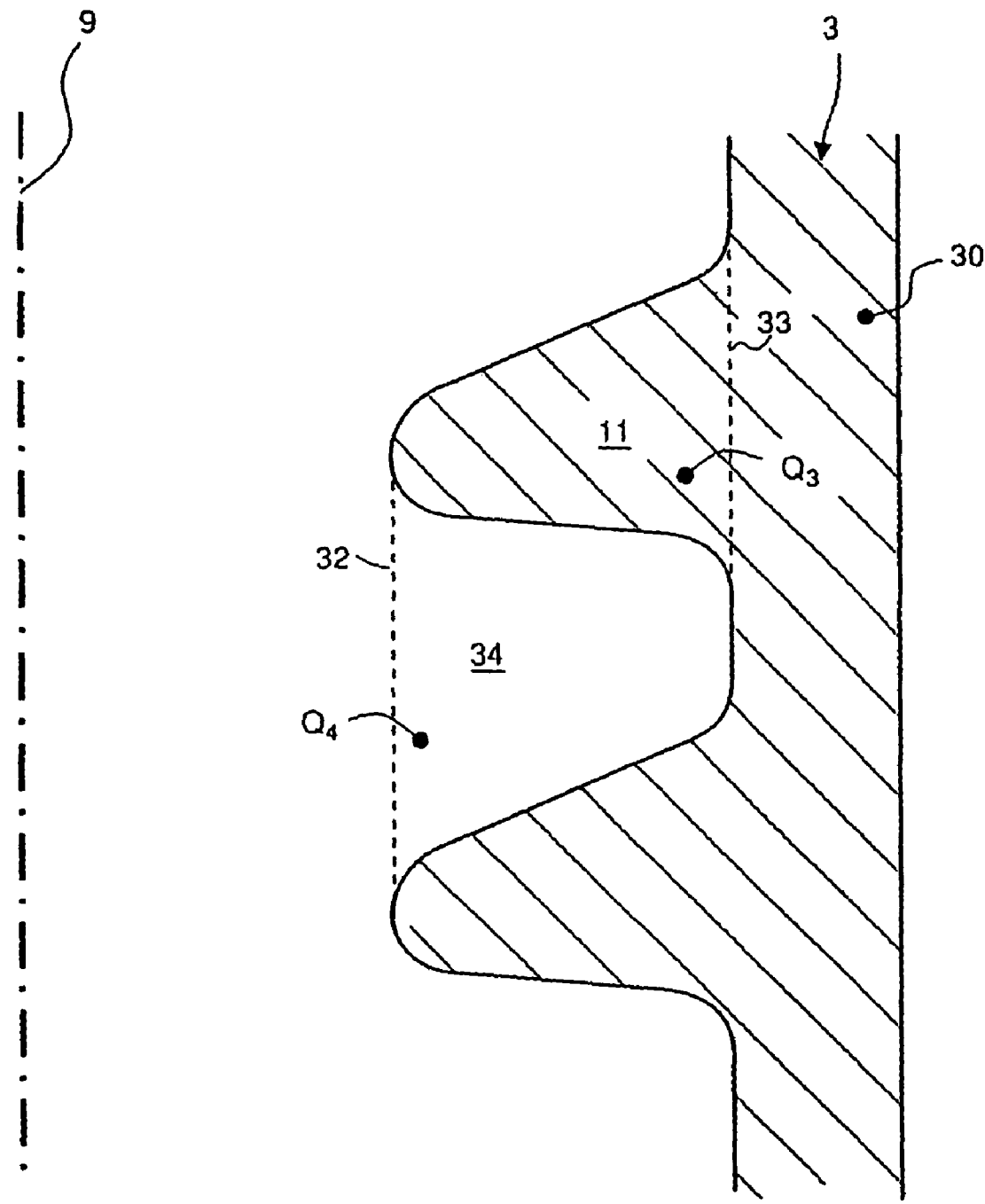
FIG. 3 is an enlarged cross-sectional view of a portion of female thread in accordance with an embodiment of the present invention.

FIG. 3 depicts an embodiment of the inventive thread as female thread (30). Female thread (30) is provided with thread flights (11) having respective cross-sectional surfaces (Q3). Between each two thread flights (11) there is a gap (34) with a respective cross-sectional area (Q4). The thread also has thread pitch (P).

In FIGS. 2 and 3, cross-sectional surfaces (Q1, Q3) of the respective thread flights (10, 11) are bounded by the outside contours of threads (20, 30) as well as by dashed lines (21, 33). Cross-sections (Q2, Q4) of respective gaps (23, 34) are bounded by the outside contours of threads (20, 30) as well as by dashed lines (31, 32).

Figure 4:
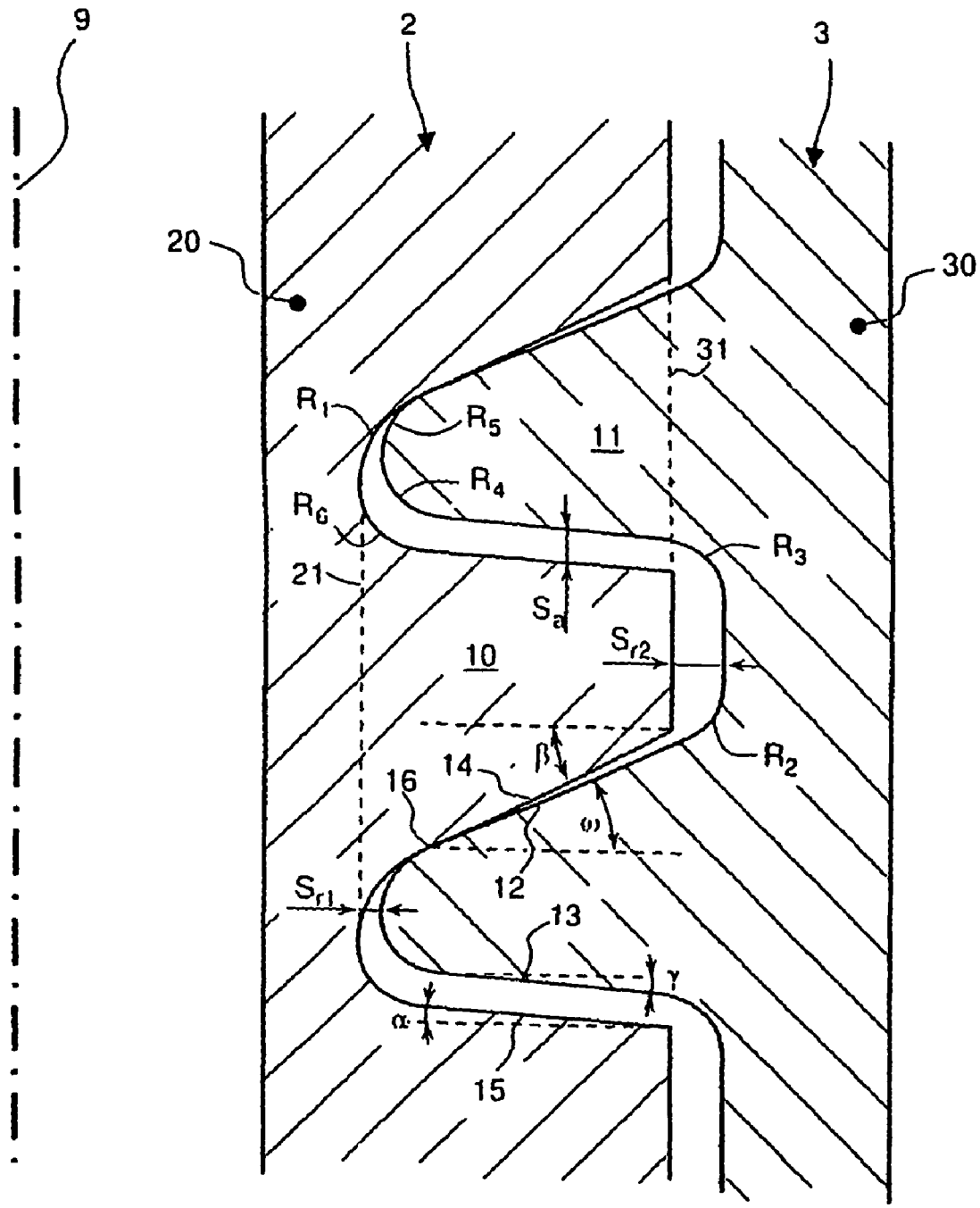
FIG. 4 illustrates a threaded connection in which male thread is threadably mated with female thread in accordance with an embodiment of the present invention.

FIG. 4 illustrates male thread (20) according to FIG. 2 and female thread (30) according to FIG. 3 threadably mated together. The following description is therefore provided with reference to FIGS. 2 to 4. Male thread (20) is made from a material, such as, for example, aluminum, that is of lesser strength than that of female thread (30), which can be made, for example, from steel. As is evident in FIG. 2, cross-sectional surface (Q1) of thread flights (10), made of the lesser strength material, is larger than the cross-section (Q2) of gap (23) between thread flights (10).

The ratio of cross-sectional surfaces (Q1, Q3) to cross-sectional areas (Q2, Q4) can be determined on the basis of need. According to an advantageous embodiment of the present invention, the ratio of cross-sectional surface (Q1) of thread flights (10) of male thread (20) to cross-section (Q2) of gap (23) between thread flights (10) is defined to at least approximately correspond to the reciprocal of the ratio of modulus of elasticity (E1) of thread flights (10) of male thread (20) to the modulus of elasticity (E2) of thread flights (11) of female thread (30), as represented by the following relationship [1]:

$$\frac{Q1}{Q2} = \frac{E2}{E1} \quad [1]$$

Cross-sections (Q1, Q2, Q3, Q4) of the thread flights and of the gaps represent only one of the variables that influence the strength of a thread. Examples of further influencing variables include resistance torques, shear strength, tensile strength and geometry of the thread flights, especially the radii.

Figure 5:
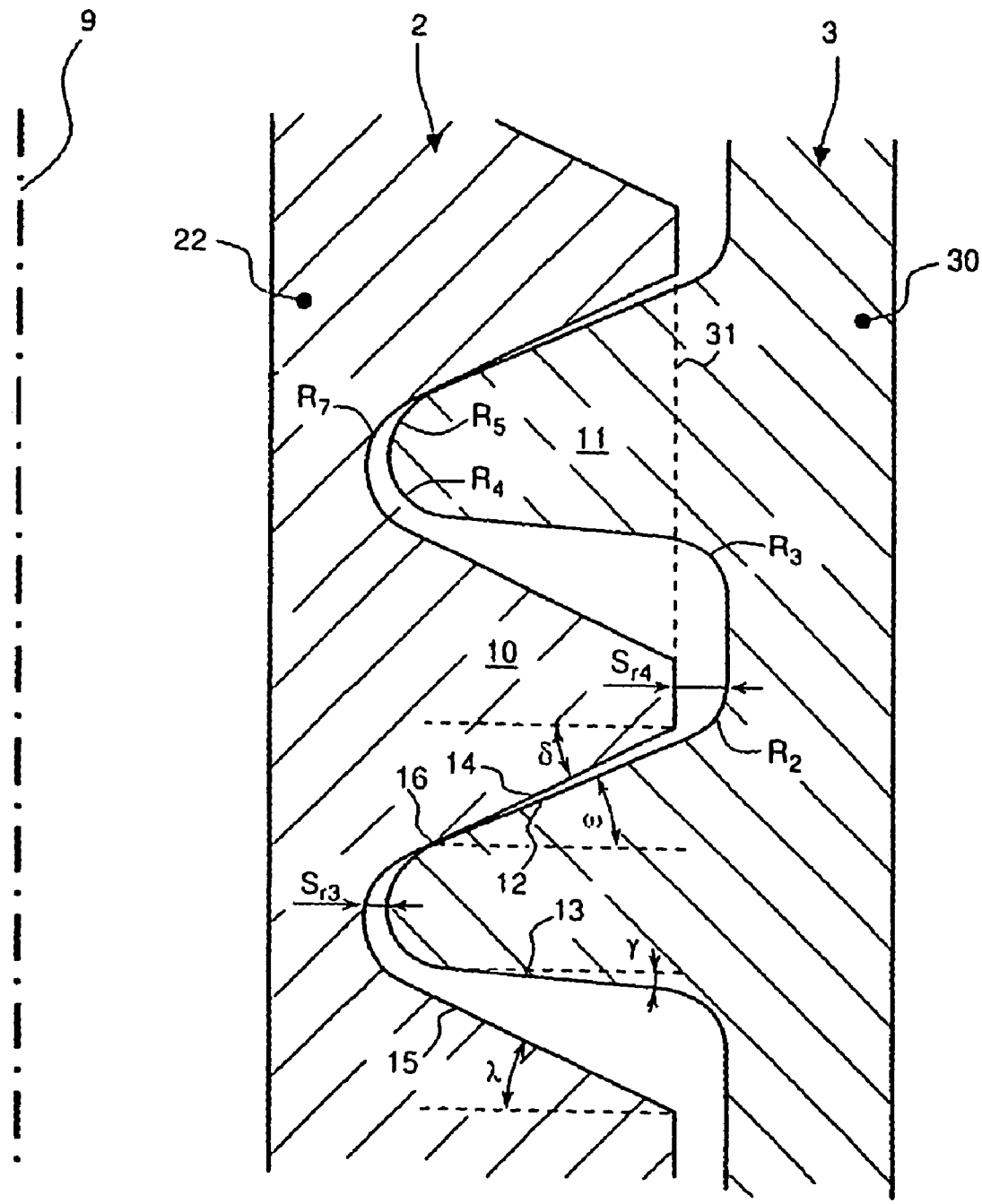
FIG. 5 illustrates a threaded connection in which female thread in accordance with an embodiment of the present invention is threadably mated with conventional male thread.

Referring now to FIG. 4, thread flights (11) of female thread (30) each have a flank portion (12, 13) which, when female thread (30) is threadably mated with male thread (20), are positioned opposite respective flanks (14, 15) of thread flights (10) of male thread (20). When the threaded connection is tightened, flank (12) comes to bear on flank (14) at a location (16). As illustrated in FIGS. 4 and 5, the longitudinal axis (9) of male thread (20) corresponds substantially to the longitudinal axis of female thread (30) in this tightened condition, and so the description hereinafter will be confined to only one longitudinal axis (9) for simplicity.

Relative to a line orthogonal to longitudinal axis (9), flank (12) has an angle (ω), flank (13) has an angle (γ), flank (14) has an angle (β) and flank (15) has an angle (α). According to an advantageous embodiment of the present invention, flanks (12, 13) have unequal angles (ω, γ), and so the following relationship [2] is true:

$$\omega \neq \gamma \quad [2]$$

According to another embodiment of the present invention, the angle (ω) has a larger absolute value than does the angle (γ), and so the following relationship [3] is true:

$$|\omega| > |\gamma| \quad [3]$$

According to a further embodiment of the present invention, flanks (14, 15) have unequal angles (β, α), and so the following relationship [4] is true:

$$\alpha \neq \beta \quad [4]$$

According to another embodiment of the present invention, the angle (β) has a larger absolute value than does the angle (α), and so the following relationship [5] is true:

$$|\beta| > |\alpha| \quad [5]$$

According to yet another advantageous embodiment of the present invention, line contact along the thread flights at location (16) is provided between flank (12) and flank (114) when the threaded connection is tightened. Compared to the flat contact of metric ISO standard threads, line contact has the advantage that slight errors of shape arising during manufacture of the threads and also unavoidable tolerances due to local deformations of male thread (20) can be compensated for in the region of location (16). Consequently, loads can be better distributed to all thread flights.

According to a still further embodiment of the present invention, the angle (β) has a larger absolute value than does the angle (ω), and so the following relationship [6] is true:

$$|\beta| > |\omega| \quad [6]$$

This has the advantage that the contact between flanks (12, 14) at location (16) takes place relatively far to the outside on thread flights (11) of female thread (30). By virtue of the resulting lever arm, the elasticity of thread flights (11) at location (16) is large compared with the elasticity of thread flights (10) at location (16). As a result, the advantage is achieved that slight errors of shape in manufacture of the thread can be compensated for by the elasticity of female thread (30), as can unavoidable tolerances, and increased stresses of the thread flights caused by such errors of shape and tolerances can be distributed better over all thread flights (11) than in the case of conventional threaded connections. Also, the fact that thread flights (11) have a slender structure compared with thread flights (10) permits a further improvement of the elasticity of female thread (30) and thus enhances the equalization of stresses over all thread flights (11).

According to another embodiment of the present invention, flanks (12, 14) brought into bearing relationship with one another when the threaded screwed connection is tightened have larger angles (ω, β) than do opposite flanks (13, 15). In other words, both relationships [3] and [5] are true.

According to an alternative embodiment of the present invention, thread pitch (P) and flank diameter can have non-standardized values.

According to a further embodiment of the present invention, female thread (30) and/or male thread (20) have rounded cross-sectional contours with radii of curvature (R1, R2, R3, R4, R5, R6), at least in partial regions.

In the embodiment depicted in FIG. 4, a rounded cross-sectional contour with radius of curvature (R1) is provided in male thread (20) in a transition region from flank (14) to a region parallel to longitudinal axis (9). This rounded cross-sectional contour with radius of curvature (R1) has a relatively gentle curvature, or, in other words, a relatively large radius of curvature (R1), resulting in the advantage that the notch effect at this location is relatively small, and the danger of damage to thread flights (10), such as stripping of a thread flight due to overtightening of the threaded screwed connection, can be considerably reduced. In a transition region from the region parallel to longitudinal axis (9) to flank (15), male thread (2) has a rounded cross-sectional contour with radius of curvature (R6).

At the transitions of flanks (12, 13) with respect to one another or with regions running parallel to longitudinal axis (9), thread flight (11) of female thread (30) has respective rounded cross-sectional contours with radii of curvature (R2, R3, R4, R5). According to an advantageous embodiment, radius of curvature (R1) is larger than radii of curvature (R2, R3, R4, R5) of female thread (30).

According to another embodiment of the present invention, an axial clearance (Sa) that is large compared with metric ISO standard threads is provided in axial direction of the threaded connection between female thread (30) and male thread (20). An axial clearance is not implicitly provided in metric ISO standard threads, but it is found in practice because of manufacturing tolerances in the production of threads. By virtue of the axial clearance (Sa) in accordance with the inventive embodiment, jamming or seizing of the threaded screwed connection is avoided.

In radial direction, the threaded connection according to FIG. 4 has a clearance (Sr1, Sr2).

The embodiment of the present invention depicted in FIG. 5 illustrates how female thread (30), described above on the basis of FIG. 3, can be applied to a device (8) in which the male thread for receiving female thread (30) is a conventional metric ISO standard thread (22). As depicted in FIG. 5, the configuration of female thread (30) according to FIG. 3 has the further advantage of being compatible with metric ISO standard threads as the male thread. In an application of the invention to a replaceable cartridge (1), the advantage lies in the fact that a replaceable cartridge (1) equipped with female thread (30) according to the invention can be screwed not only into a male thread (20) configured according to the invention but also into a conventional metric ISO standard thread.

As depicted in FIG. 5, male thread (22) is designed as a metric ISO standard thread with symmetric flanks (14, 15) of thread flights (10). That is, angle (6) of flank (14) relative to a line orthogonal to longitudinal axis (9) corresponds to angle (X) of opposite flank (15) relative to a line orthogonal to longitudinal axis (9). Between flanks (14, 15), the metric ISO standard thread has a radius of curvature (R7).

As can be further appreciated from FIG. 5, many of the advantages of the present invention described above are preserved in combination with metric ISO standard threads as the male thread (22). In this case, for example, the line contact discussed above is realized between flank (12) and flank (14) at location (16).

According to an advantageous embodiment of the present invention, the following values for the variables described above can be chosen:

$Q1/Q2>1.2$ $Q4/Q3>1.2$

Thread pitch (P) in the range from 1.0 mm to 3.0 mm
γ in the range from 0 degrees to 10 degrees
ω in the range from 20 degrees to 29 degrees
α in the range from 0 degrees to 10 degrees
β in the range from 21 degrees to 35 degrees R1/P in the range of 0.1 to 0.3
R2/P in the range of 0.07 to 0.27
R3/P in the range of 0.07 to 0.17
R4/P in the range of 0.07 to 0.2
R5/P in the range of 0.07 to 0.2
R6/P in the range of 0.03 to 0.2
Sa/P is chosen from the range of 0.01 to 0.07
Sr1/P is chosen from the range of 0.03 to 0.1
Sr2/P is chosen from the range of 0.03 to 0.17
Sr3/P is chosen from the range of 0.03 to 0.1
Sr4/P is chosen from the range of 0.03 to 0.17
(values normalized to the thread pitch (P))

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A replaceable cartridge system for a vehicle, comprising an air-dryer cartridge having a female thread threadably engageable with a mount having a male thread, said female and male threads each including thread flights, said thread flights of said female thread being formed from a first material having a strength different than that of a second material forming said thread flights of said male thread, said thread flights of said female thread having cross-sectional surfaces smaller than cross-sectional areas of gaps therebetween, and said thread flights of said male thread having cross-sectional surfaces larger than cross-sectional areas of gaps therebetween, wherein opposing flanks of said thread flights of said female thread have unequal angles relative to a line orthogonal to a longitudinal axis of said female thread, wherein a flank of said female thread brought into bearing relationship with a flank of said male thread when said female and male threads are in tightened threaded engagement defines an angle of larger absolute value relative to said line orthogonal to a longitudinal axis of said female thread than does an opposing flank of said female thread, and wherein said flanks of said female and male threads brought into bearing relationship with one another when said female and male threads are in tightened threaded engagement have line contact.

2. The replaceable cartridge system according to claim 1, wherein a ratio of (i) said cross-sectional surfaces of said thread flights of said second material to (ii) said cross-sectional areas of said gaps therebetween is greater than about 1.2.

3. The replaceable cartridge system according to claim 1, wherein a ratio of (i) said cross-sectional surfaces of said gaps between said thread flights of said first material to (ii) said cross-sectional surfaces of said thread flights of said first material is greater than about 1.2.

4. The replaceable cartridge system according to claim 1, wherein a ratio of said cross-sectional surfaces of said thread flights of said male thread to said cross-sectional areas of said gaps therebetween corresponds to a reciprocal of a ratio of a modulus of elasticity of said thread flights of said male thread to a modulus of elasticity of said thread flights of said female thread.

5. A replaceable cartridge system for a vehicle, comprising an air-dryer cartridge having a female thread threadably engageable with a mount having a male thread, said female and male threads each including thread flights, said thread flights of said female thread being formed from a first material having a strength different than that of a second material forming said thread flights of said male thread, and said thread flights having cross-sectional surfaces different from cross-sectional areas of gaps therebetween, wherein opposing flanks of said thread flights of said female thread having unequal angles relative to a line orthogonal to a longitudinal axis of said female thread, and wherein a flank of said female thread brought into bearing relationship with a flank of said male thread when said female and male threads are in tightened threaded engagement defines an angle of smaller absolute value relative to said line orthogonal to a longitudinal axis of said female thread than does said flank of said male thread.

6. The replaceable cartridge system according to claim 1, wherein at least a part of at least one of said female thread and said male thread has a rounded cross-sectional contour.

7. The replaceable cartridge system according to claim 5, wherein said female thread has rounded cross-sectional contours and said male thread has at least one rounded cross-sectional contour with a radius of curvature that is larger than each radii of curvature of said rounded cross-sectional contours of said female thread.

8. The replaceable cartridge system according to claim 1, wherein a preselected axial clearance is provided between said female thread and said male thread.

9. The replaceable cartridge system according to claim 1, wherein said male thread is formed from aluminum and said female thread is formed from steel.

10. A mount for an air-dryer cartridge, comprising a female thread threadably engageable with a male thread of said cartridge, said female thread including thread flights, said thread flights of said female thread being formed from a first material having a strength different from a second material forming thread flights of said male thread, said thread flights of said female thread having cross-sectional surfaces smaller than cross-sectional areas of gaps therebetween, and said thread flights of said male thread having cross-sectional surfaces larger than cross-sectional areas of gaps therebetween, wherein opposing flanks of said thread flights of said female thread have unequal angles relative to a line orthogonal to a longitudinal axis of said female thread, wherein a flank of said female thread bearable against a flank of said male thread when said female male threads are in tightened threaded engagement defines an angle of larger absolute value relative to said line orthogonal to a longitudinal axis of said female thread than does an opposing flank of said female thread, and wherein said flanks of said female and male threads brought into bearing relationship with one another when said female and male threads are in tightened threaded engagement have line contact.

11. An air-dryer cartridge for a compressed-air system in a vehicle, comprising a male thread threadably engageable with a female thread of a mount for said cartridge, said male thread including thread flights, said thread flights of said male thread being formed from a first material having a strength different from a second material forming thread flights of said females thread, said thread flights of said female thread having cross-sectional surfaces smaller than cross-sectional areas of gaps therebetween, and said thread flights of said male thread having cross-sectional surfaces larger than cross-sectional areas of gaps therebetween, wherein opposing flanks of said thread flights of said male thread have unequal angles relative to a line orthogonal to a longitudinal axis of said male thread, wherein a flank of said male thread bearable against a flank of said female thread when said female and male threads are in tightened threaded engagement defines an angle of larger absolute value relative to said line orthogonal to a longitudinal axis of said male thread than does an opposing flank of said male thread, and wherein said flanks of said male and female threads brought into bearing relationship with one another when said female and male threads are in tightened threaded engagement have line contact.

12. A mount for an air-dryer cartridge, comprising a male thread threadably engageable with a female thread of said cartridge, said male thread including thread flights, said thread flights of said male thread being formed from a first material having a strength different from a second material forming thread flights of said female thread, said thread flights of said female thread having cross-sectional surfaces smaller than cross-sectional areas of gaps therebetween, and said thread flights of said male thread having cross-sectional surfaces larger than cross-sectional areas of gaps therebetween, wherein opposing flanks of said thread flights of said male thread have unequal angles relative to a line orthogonal to a longitudinal axis of said male thread, wherein a flank of said male thread bearable against a flank of said female thread when said female and male threads are in tightened threaded engagement defines an angel of larger absolute value relative to said line orthogonal to a longitudinal axis of said male thread than does an opposing flank of said male thread, and wherein said flanks of said male and female threads brought into bearing relationships with one another when said female and male threads are in tightened threaded engagement have line contact.

13. An air-dryer cartridge for a compressed-air system in a vehicle, comprising a female thread threadably engageable with a male thread of a mount for said cartridge, said female thread including thread flights, said thread flights of said female thread being formed from a first material having a strength different from a second material forming thread flights of said male thread, said thread flights of said female thread having cross-sectional surfaces smaller than cross-sectional areas of gaps therebetween, and said thread flights of said male thread having cross-sectional surfaces larger than cross-sectional areas of gaps therebetween, wherein opposing flanks of said thread flights of said female thread have unequal angles relative to a line orthogonal to a longitudinal axis of said female thread, wherein a flank of said female thread bearable against a flank of said male thread when said female and male threads are in tightened threaded engagement defines an angle of larger absolute value relative to said line orthogonal to a longitudinal axis of said female thread than does an opposing flank of said female thread, and wherein said flanks of said female and male threads brought into bearing relationship with one another when said female and male threads are in tightened threaded engagement have line contact.

14. The replaceable cartridge system according to claim 1, wherein said air-dryer cartridge includes said male thread and said mount includes said female thread.

15. A replaceable cartridge system for a vehicle, comprising an air-dryer cartridge having a female thread threadably engageable with a mount having a male thread, said female and male threads each including threads flights, said thread flights of said female thread being formed from a first material having a strength different than that of a second material forming said thread flights of said male thread, said thread flights of said female thread having cross-sectional surfaces smaller cross-sectional areas of gaps therebetween, and said thread flights of said male thread having cross-sectional surfaces larger than cross-sectional areas of gaps therebetween, wherein opposing flanks of said thread flights of said male thread have unequal angles relative to a ling orthogonal to a longitudinal axis of said male thread, wherein flanks of said male and said female threads brought into bearing relationship with one another when said female and male threads are in tightened threaded engagement define angles of larger absolute value relative to said line orthogonal to a longitudinal axis of said male thread than do opposing flanks of said male and female threads, and wherein said flanks of said male and female threads brought into bearing relationship with one another when said female and male threads are in tightened threaded engagement have line contact.

16. The replaceable cartridge system according to claim 15, wherein a ratio of (i) said cross-sectional surfaces of said thread flights of said second material to (ii) said cross-sectional areas of said gaps therebetween is greater than about 1.2.

17. The replaceable cartridge system according to claim 15, wherein a ratio of (i) said cross-sectional surfaces of said gaps between said thread flights of said first material to (ii) said cross-sectional surfaces of said thread flights of said first material is greater than about 1.2.

18. The replaceable cartridge system according to claim 15, wherein a ratio of said cross-sectional surfaces of said thread flights of said male thread to said cross-sectional areas of said gaps therebetween corresponds to a reciprocal of a ratio of a modulus of elasticity of said thread flights of said male thread to a modulus of elasticity of said thread flights of said female thread.

19. A replaceable cartridge system for a vehicle, comprising an air-dryer cartridge having a female thread threadably engageable with a mount having a male thread, said female and male threads each including thread flights, said thread flights of said female thread being formed from a first material having a strength different than that of a second material forming said thread flights of said male thread, and said thread flights having cross-sectional surfaces different from cross-sectional areas of gaps therebetween, wherein opposing flanks of said thread flights of said male thread have unequal angles relative to a line orthogonal to a longitudinal axis of said male thread, and wherein flanks of said male and said female threads brought into bearing relationship with one another when said female and male threads are in tightened threaded engagement define angles of larger absolute value relative to said line orthogonal to a longitudinal axis of said male thread than do opposing flanks of said male and female thread, and wherein a flank of said female thread brought into bearing relationship with a flank of said male thread when said female and male threads are in tightened threaded engagement defines an angle of smaller absolute value relative to said line orthogonal to a longitudinal axis of said male thread than does said flank of said male thread.

20. The replaceable cartridge according to claim 15, wherein at least a part of at least one of said female thread and said male thread has a rounded cross-sectional contour.

21. The replaceable cartridge system according to claim 19, wherein said female thread has rounded cross-sectional contours and said male thread has at least one rounded cross-sectional contour with a radius of curvature that is larger than each radii of curvature of said rounded cross-sectional contours of said female thread.

22. The replaceable cartridge system according to claim 15, wherein a preselected axial clearance is provided between said female thread and said male thread.

23. The replaceable cartridge system according to claim 15, wherein said mail thread is formed from aluminum and said female thread is formed from steel.

24. The replaceable cartridge system according to claim 1, wherein said first material has a strength greater than that of said second material.

25. The replaceable cartridge system according to claim 15, wherein said first material has a strength greater than that of said second material.

26. A replaceable cartridge system for a vehicle, comprising an air-dryer cartridge having a male thread threadably engageable with a mount having a female thread, said male and female threads each including thread flights, said thread flights of said male thread being formed from a first material having a strength different from a second material forming said thread flights of said female thread, said thread flights of said female thread having cross-sectional surface smaller than cross sectional areas of gaps therebetween, and said thread flights of said male thread having cross-sectional surfaces larger than cross-sectional areas of gaps therebetween, wherein opposing flanks of said thread flights of said male thread have unequal angles relative to a line orthogonal to a longitudinal axis of said male thread, wherein a flank of said male thread bearable against a flank of said female thread when said female and male threads are in tightened threaded engagement defines an angle of larger absolute value relative to said line orthogonal to a longitudinal axis of said male thread than does an opposing flank of said male thread, and wherein said flanks of said male and female threads brought into bearing relationship with one another when said female and male threads are in tightened threaded engagement have line contact.

27. The replaceable cartridge system according to claim 26, wherein a ratio of (i) said cross-sectional surfaces of said thread flights of said second material to (ii) said cross-sectional areas of said gaps therebetween is greater than about 1.2.

28. The replaceable cartridge system according to claim 26, wherein a ratio of (i) said cross-sectional surfaces of said gaps between said thread flights of said first material to (ii) said cross-sectional surfaces of said gaps between said thread flights of said first material to (ii) said cross-sectional surfaces of said thread flights of said first material is greater than about 1.2.

29. The replaceable cartridge system according to claim 26, wherein a ratio of said cross-sectional surfaces of said thread flights of said male thread to said cross-sectional areas of said gaps therebetween corresponds to a reciprocal of a ratio of a modulus of elasticity of said thread flight of said male thread to a modulus of elasticity of said thread flights of said female thread.

30. The replaceable cartridge system according to claim 26, wherein at least a part of at least one of said female thread and said male thread has a rounded cross-sectional contour.

31. The replaceable cartridge system according to claim 26, wherein said female thread has rounded cross-sectional contours and said male thread has at least one rounded cross-sectional contour with a radius of curvature that is larger than each radii of curvature of said rounded cross-sectional contours of said female thread.

32. The replaceable cartridge system according to claim 26, wherein a preselected axial clearance is provided between and female thread and said male thread.

33. The replaceable cartridge system according to claim 26, wherein said first material has a strength greater than that of said second material.

34. The replaceable cartridge system according to claim 26, wherein said male thread is formed from aluminum and said female thread is formed from steel.

35. A mount of an air-dryer cartridge, comprising a male thread threadably engageable with a female thread of said cartridge, said female and male threads each including thread flights, said thread flights of said female thread being formed from a first material having a strength different than that of a second material forming said thread flights of said male thread, and said thread flights having cross-sectional surfaces different from cross-sectional areas of gaps therebetween, wherein opposing flanks of said thread flights of said female thread, and wherein a flank of said female thread brought into bearing relationship with a flank of said male thread when said female and male threads are in tightened threaded engagement defines an angle of smaller absolute value relative to said line orthogonal to a longitudinal axis of said female thread than does said flank of said male thread.

36. An air-dryer cartridge for compressed-air system in a vehicle, comprising a male thread threadably engageable with a female thread of a mount for said cartridge, said female threads each including thread flights, said thread flights of said female thread being formed from a first material having a strength different than that of a second material forming said thread flights of said male thread, and said thread flights having cross-sectional material forming said thread flights of said male thread, and said thread flights having cross-sectional surfaces different from cross-sectional areas of gaps therebetween, wherein opposing flanks of said thread flights of said female thread have unequal angles relative to a ling orthogonal to a longitudinal axis of said female thread, and wherein a flank of said female thread brought into bearing relationship with a flank of said male thread when said female and male threads are in tightened threaded engagement defines an angle of smaller absolute value relative to said line orthogonal to a longitudinal axis of said female thread than does said flank of said male thread.

37. A mount for an air-dryer cartridge, comprising a male thread threadably engageable with a female thread of said cartridge, said female and male threads each including thread flights, said thread flights of said female thread being formed from a first material having a strength different than that of a second material forming said thread flights of said male thread, said thread flights of said female thread having cross-sectional surfaces smaller than cross-sectional areas of gaps therebetween, and said thread flights of said male thread having cross-sectional surfaces larger than cross-sectional areas of gaps therebetween, wherein opposing flanks of said thread flights of said male thread have unequal angles relative to a line orthogonal to a longitudinal axis of said male thread, wherein flanks of said male and said female threads brought into bearing relationship with one another when said female and male threads are in tightened threaded engagement define angles of larger absolute value relative to said line orthogonal to a longitudinal axis of said male thread than do opposing flanks of said male and female threads, and wherein said flanks of said male and female threads brought into bearing relationship with one another when said female and male threads are in tightened threaded engagement have line contact.

38. An air-dryer cartridge for a compressed-air system in a vehicle, comprising a male thread threadably engageable with a female thread of mount for said cartridge, said female and male thread threadably engageable with a female thread of a mount for said cartridge, said female and male threads each including thread flights, said thread flights of said female thread being formed from a first material having a strength different than that of a second material forming said thread flights of said male thread, said thread flights of said female thread having cross-sectional surfaces smaller than cross-sectional areas of gaps therebetween, and said thread flights of said male thread having cross-sectional surfaces larger than cross-sectional areas of gaps therebetween, wherein opposing flanks of said thread flights of said male thread have unequal angles relative to a line orthogonal to a longitudinal axis of said male thread, wherein flanks of said male and said female threads brought into bearing relationship with one another when said female and male threads are in tightened threaded engagement define angels of larger absolute value relative to said line orthogonal to a longitudinal axis of said male thread than do opposing flanks of said male and female threads, and wherein said flanks of said male and female threads brought into bearing relationship with one another when said female and male threads are in tightened threaded engagement have line contact.

39. A mount for an air-dryer cartridge, comprising a male thread threadably engageable with a female thread of said cartridge, said female and male threads each including thread flights, said thread flights of said female thread being formed from a first material having a strength different than that of a second material forming said thread flights of said male thread, and said thread flights having cross-sectional surfaces different from cross-sectional areas of gaps therebetween, wherein opposing flanks of said thread flights of said male thread have unequal angles relative to a line orthogonal to a longitudinal axis of said male thread, and wherein flanks of said male and said female threads brought into bearing relationship with one another when said female and male threads are in tightened threaded engagement define angles of larger absolute value relative to said line orthogonal to a longitudinal axis of said male thread than do opposing flanks of said male and female threads, and wherein a flank of said female thread brought into bearing relationship with a flank of said male thread when said female and male threads are in tightened threaded engagement defines an angle of smaller absolute value relative to said line orthogonal to a longitudinal axis of said male thread than does said flank of said male thread.

40. An air-dryer cartridge for a compressed-air system in a vehicle, comprising a male thread threadably engageable with a female thread of a mount for said cartridge, said female and male threads each including thread flights, said flights or said female thread being formed from a first material having a strength different than that of a second material forming said thread flights of said male thread, and said thread flights having cross-sectional surfaces different from cross-sectional areas of gaps therebetween, wherein opposing flanks of said thread flights of said male thread have unequal angles relative to a line orthogonal to a longitudinal axis of said male thread, and wherein flanks of said male and said female threads brought into bearing relationship with on another when said female and male threads are in tightened threaded engagement define angles of larger absolute value relative to said line orthogonal to a longitudinal axis of said male thread than do opposing flanks of said male and female threads, and wherein a flank of said female thread brought into bearing relationship with a flank of said male thread when said female and male threads are in tightened threaded engagement defines an angle of smaller absolute value relative to said line orthogonal to a longitudinal axis of said male thread than does said flank of said male thread.

* * * * *